(12) United States Patent
Popelka et al.

(10) Patent No.: US 12,309,109 B2
(45) Date of Patent: *May 20, 2025

(54) TECHNIQUES FOR COMMUNICATION PROCESS FLOW APPROVAL MANAGEMENT

(71) Applicant: Salesforce, Inc., San Francisco, CA (US)

(72) Inventors: Aaron M. Popelka, San Francisco, CA (US); William Robert Jennings, II, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,851

(22) Filed: Sep. 19, 2023

(65) Prior Publication Data
US 2024/0007426 A1 Jan. 4, 2024

Related U.S. Application Data

(63) Continuation of application No. 17/649,029, filed on Jan. 26, 2022, now Pat. No. 11,792,146.

(51) Int. Cl.
*H04L 51/10* (2022.01)
*G06F 16/27* (2019.01)
(Continued)

(52) U.S. Cl.
CPC ............. *H04L 51/10* (2013.01); *G06F 16/27* (2019.01); *H04L 51/52* (2022.05); *H04L 51/56* (2022.05);
(Continued)

(58) Field of Classification Search
CPC ....... H04L 51/10; H04L 69/24; H04L 63/102; H04L 51/52; H04L 51/56; H04L 67/02; G06F 16/27
See application file for complete search history.

(56) References Cited

U.S. PATENT DOCUMENTS 10,346,378 B1 * 7/2019 Jones ................. H04L 67/1097
2007/0192156 A1 * 8/2007 Gauger .............. G06Q 10/0633
705/7.19
(Continued)

*Primary Examiner* — Jungwon Chang
(74) *Attorney, Agent, or Firm* — Holland & Hart LLP

(57) ABSTRACT

Methods, systems, apparatuses, devices, and computer program products are described. A communication platform may receive a first request indicating a first data object comprising metadata associated with an update to an action of a communication process flow. The metadata may indicate that a user with particular permissions is to approve the update. The communication platform may post an entry displaying the metadata and configured to receive an indication of approval of the update from the user. The communication platform may receive an indication of the approval from the user, for example via a user interface component. The communication platform may generate a second data object indicating the action and the user, ensuring that the update was successfully approved, and transmit a second request to a communication process flow management service supporting the communication process flow, the second request including the second object and configured to activate the update.

20 Claims, 10 Drawing Sheets

(51) Int. Cl.
*H04L 51/52* (2022.01)
*H04L 51/56* (2022.01)
*H04L 67/02* (2022.01)
*H04L 69/24* (2022.01)
*H04L 9/40* (2022.01)

(52) U.S. Cl.
CPC .............. *H04L 67/02* (2013.01); *H04L 69/24* (2013.01); *H04L 63/102* (2013.01)

(56) References Cited

U.S. PATENT DOCUMENTS

| | | | |
|---|---|---|---|
| 2019/0324948 A1* | 10/2019 | Xu | G06F 3/0484 |
| 2020/0014604 A1* | 1/2020 | Smith | H04L 41/0253 |
| 2022/0292372 A1* | 9/2022 | Joshy | G06Q 10/06311 |
| 2023/0096084 A1* | 3/2023 | Popelka | G06F 9/4881 |
| | | | 726/4 |

* cited by examiner

TECHNIQUES FOR COMMUNICATION PROCESS FLOW APPROVAL MANAGEMENT

CROSS REFERENCE

The present application for patent is a Continuation of U.S. patent application Ser. No. 17/649,029 by POPELKA et al., entitled "TECHNIQUES FOR COMMUNICATION PROCESS FLOW APPROVAL MANAGEMENT," filed Jan. 26, 2022, assigned to the assignee hereof, and expressly incorporated by reference herein.

FIELD OF TECHNOLOGY

The present disclosure relates generally to database systems and data processing, and more specifically to techniques for communication process flow approval management.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement a communication process flow that controls communications between a tenant and a set of users (e.g., subscribers). In addition, a communication platform may be used for internal communications related to the communication process flow. However, in some cases, users may lack the ability to approve edits or updates made to a communication process flow, which may create workflow inefficiencies and limit updates to communication process flows.

DETAILED DESCRIPTION

Figure 1:
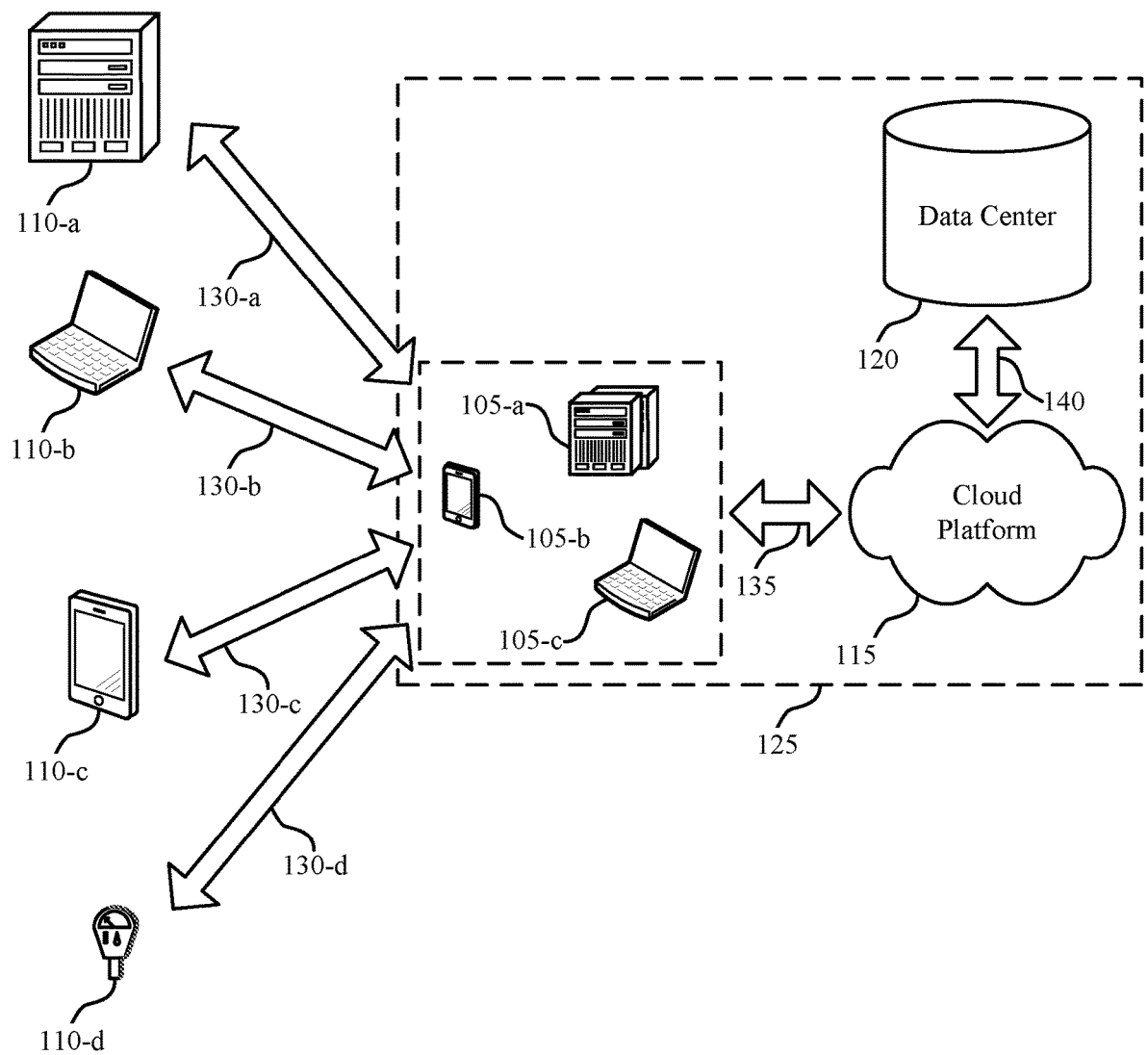
FIG. 1 illustrates an example of a data processing system that supports techniques for communication process flow approval management in accordance with aspects of the present disclosure.

Techniques described herein support approval of a communication process flow via a communication platform. A communication process flow management service may support creation, configuration, management, and deployment of a communication process flow that manages communications between a set of users and a tenant or organization. For example, an organization or tenant may use the communication process flow management service to schedule and manage communications between the organization and a set of users, which may be examples of subscribers, customers, or prospective customers of the organization. Users may receive electronic communications (e.g., emails, messages, advertisements) according to a communication process flow. The communication process flow may include various actions and message configurations, and transmission of various communications may be dependent on user attributes and user web behavior, among other parameters, according to the communication process flow.

Administrative users or employees associated with the tenant (e.g., a marketing team) may manually or automatically adjust aspects of the communication process flow, for example, based on communication metrics associated with the communication process flow (e.g., statistics associated with one or more electronic communications controlled by a communication process flow). For example, these communication metrics may be used to support changing of content items (e.g., subject lines, images), communication frequencies, or transmission times, among other examples. In some examples, the administrative users or employees associated with the tenant may communicate, plan, and monitor aspects of a communication process flow using a communication platform. For example, the communication platform may support communication channels that are organized by topic, and team members may use these communication channels (e.g., a chat room) to make decisions regarding a communication process flow. In some examples, however, users may lack the ability to approve edits or updates made to communication process flows, which may result in workflow inefficiencies and a limited use of communication process flows. Further, a lack of such approval processes may result in wasteful communications, which may reduce computing efficiencies (e.g., wasted processor and communication resources, such as bandwidth).

Techniques described herein provide for communication process flow approval management via a communication platform. For example, the described techniques may support collaboration, communication, and approvals of updates to communication process flows directly from the communication platform. In some examples, a communication platform may receive a first request (e.g., from a communication process flow management service) indicating a first data object that includes metadata associated with an update to an action of a communication process flow. The metadata may indicate that a user (e.g., an approver) of the communication platform is to approve the update to the action. In some examples, the user may be preconfigured with particular permissions to approve the update. Based on receiving the request, an entry may be posted into a channel of the communication platform that is associated with the communication process flow, and the entry may display the metadata and may be configured to receive an indication of approval of the update from the user. For example, the entry may include details about the update, and may include a UI component (e.g., a button) which the user may select to approve the update.

In some examples, upon receiving an indication of the approval of the update from a user, the communication platform may generate a second data object indicating the action and an indication of the user who approved the update. In some examples, the communication platform may transmit a second request to the communication process flow management service including the generated second data object. The second request may be configured to activate the update to the action at the communication process flow. Thus, using these techniques, a user may activate an updated action of the communication process flow directly from the communication platform, which may provide for improved workflow efficiencies, greater cross-platform compatibility, and higher user satisfaction, among other benefits.

Aspects of the disclosure are initially described in the context of an environment supporting an on-demand database service. Aspects of the disclosure are then described in the context of computer architectures, user interfaces, and process flows. Aspects of the disclosure are further illustrated by and described with reference to apparatus diagrams, system diagrams, and flowcharts that relate to techniques for communication process flow approval management.

FIG. 1 illustrates an example of a data processing system 100 for cloud computing that supports techniques for communication process flow approval management in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to particular applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

One or both of the cloud platform 115 or the subsystem 125 may support a communication process flow management service, which may be used to configure a communication process flow. As described herein, a communication process flow may control electronic communications (e.g., emails, messages, advertisements) between a tenant (e.g., a cloud client 105) of a multi-tenant system and a set of users (e.g., contacts 110) associated with the tenant. The communication process flow may include various actions that are used to manage these electronic communications. For example, the communication process flow may include emails, decision splits, wait periods, and the like. In addition, the communication process flow may include different routes (e.g., sets of actions) that are configured via the communication process flow management service. Whether a user receives messages via a specific route may depend on attributes or behaviors of the user (e.g., interests, activity patterns, demographic information). These attributes may be stored in association with user identifiers at the data center 120.

Communication process flows may be configured by teams of administrators or users associated with the tenant (e.g., employees of an organization corresponding to the tenant). For example, these users may perform various activities related to configuring, reviewing, activating, and monitoring communication process flows using the communication process flow management service. In some cases, these users may discuss various aspects (e.g., performance, implementation) of a communication process flow via a communication platform that is separate from one or both of the cloud platform 115 or the subsystem 125 supporting the communication process flow and the communication process flow management service. That is, the communication process flow management service and the communication platform may be supported by different computing systems or cloud platforms. The communication platform may enable users to exchange messages in various chat rooms or communication channels that may be specific to a project, team, topic, or the like.

However, users may lack the ability to approve edits or updates made to communication process flows in some cases. Without receiving approval for the edits or updates (e.g., from an administrative user), the user may lack trust in the communication process flow management service and the communication platform as the user may be concerned that they have missed or incorrectly executed a crucial change to the communication process flow. For example, a user may edit the content of an email that is controlled by the communication process flow. Without receiving approval for this change, the user may be concerned that hundreds or thousands of emails may be sent to incorrect individuals or with incorrect information. As such, a lack of an approval process for the communication process flow may result in decreased user satisfaction. Additionally, a lack of a mechanism for approving the updates from the communication platform may limit the abilities of users using the communication platform, introducing workflow efficiencies. Further, as a result, the communication process flow may transmit messages or emails, which may waste valuable computing resources at both the transmitting device and receiving device.

Techniques described herein and supported by the data processing system 100 may provide for communication process flow approval management via the communication platform. For example, the described techniques may support collaboration, communication, and approvals of updates to communication process flows directly in the communication platform. To support collaboration, communication, and approvals, as well as reduced communication resource utilization, the communication platform and the communication process flow management service may be configured to communicate information and data. This cross-platform communication may be supported by application programming interfaces (APIs) and other communication facilities. In some examples, a communication platform may receive a first request (e.g., from a communication process flow management service supported by the cloud platform 115) indicating a first data object that includes metadata associated with an update to an action of a communication process flow. The metadata may indicate that a user (e.g., an approver) of the communication platform is to approve the update to the action. In some examples, the user may be preconfigured with permissions to approve the update (e.g., the user may be an approver). Based on receiving the request, an entry may be posted into a channel of the communication platform that is associated with the communication process flow. The entry may display the metadata and may be configured to receive an indication of approval of the update from the user. For example, the entry may include details about the update to the action, and may include a UI component (e.g., a button) which the user may select to approve the update.

In some examples, upon receiving an indication of the approval of the update from a user, the communication platform may generate a second data object indicating the action and an indication of the user who approved the update. In some examples, the communication platform may transmit a second request to the communication process flow management service including the second data object and configured to activate the update to the action at the communication process flow. Accordingly, a user may activate an update to an action of the communication process flow directly from the communication platform. In addition, the updates may remain in the communication process flow management platform without being activated until they are approved.

Communication process flow approval management directly from a communication platform may support improved workflow efficiencies, reduced processing overhead, and increased customer satisfaction by reducing extraneous communications and enabling approvals of updates to communication process flows. For example, the described techniques may enable users with particular permissions to approve changes to communication process flows directly from the communication platform, which may support improved workflow efficiency by reducing a frequency that a user switches between various platforms to perform various tasks associated with a communication process flow. Additionally, because the techniques described herein may enable permissions such that particular users may approve updates to a communication process flows, the described techniques may provide for increased user satisfaction as users may trust that their updates are correct after approval. Further, these approval processes may result in reduced wasteful communications, which may improve computing efficiencies (e.g., less wasted processor and communication resources, such as bandwidth).

It should be appreciated by a person skilled in the art that one or more aspects of the disclosure may be implemented in a data processing system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
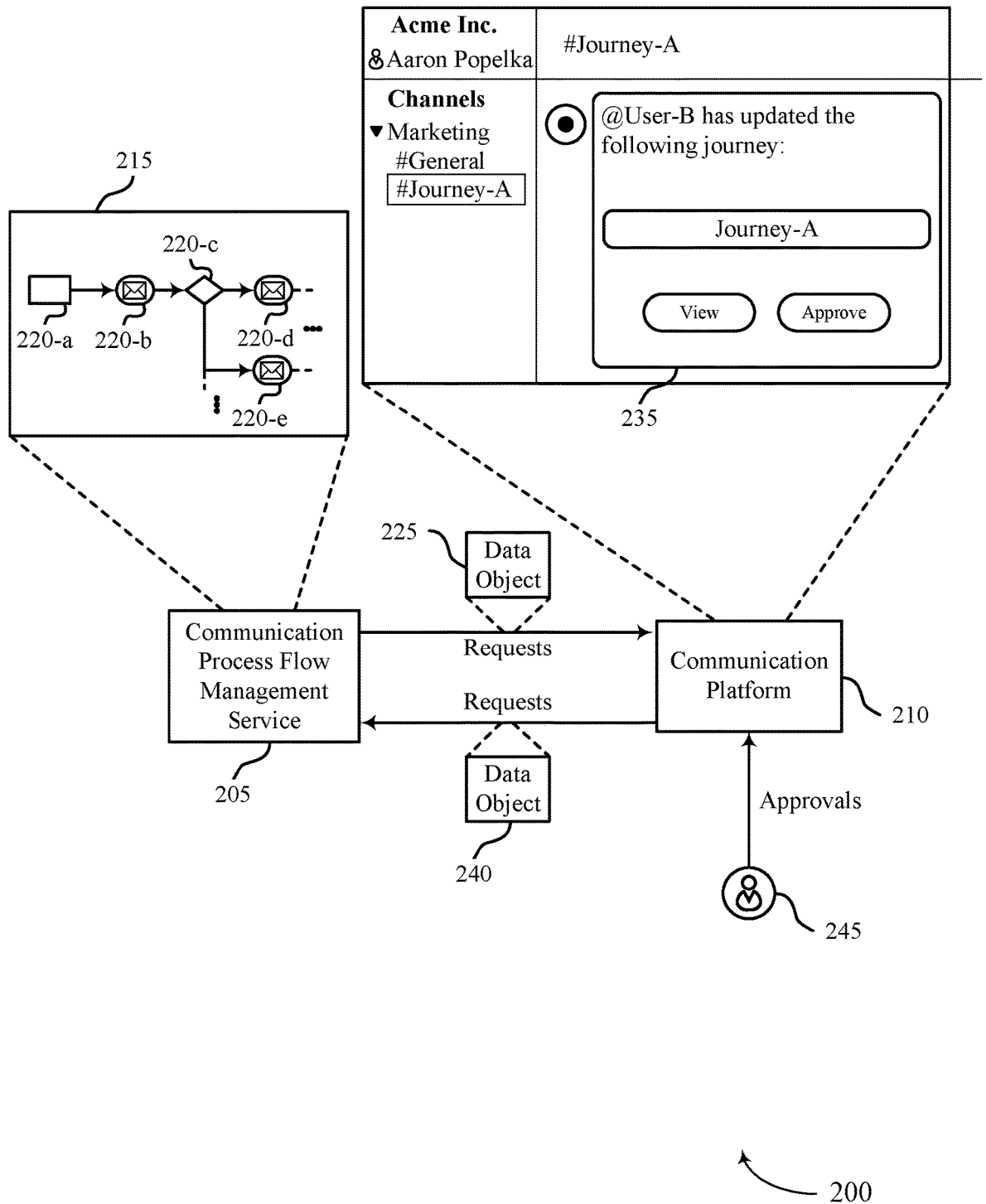
FIG. 2 illustrates an example of a computing architecture that supports techniques for communication process flow approval management in accordance with aspects of the present disclosure.

FIG. 2 illustrates an example of a computing architecture 200 that supports techniques for communication process flow approval management in accordance with aspects of the present disclosure. The computing architecture 200 may implement or be implemented by aspects of the data processing system 100. For example, the computing architecture 200 may include a communication process flow management service 205 and a communication platform 210, each of which may be implemented by aspects of a cloud platform 115 or a subsystem 125 described with reference to FIG. 1. In some examples, the systems or servers supporting the communication platform 210 may include computing systems that are logically or physically separated from systems or servers supporting the communication process flow management service 205.

As described herein, the communication process flow management service 205 may support creation, configuration, and implementation of various communication process flows (e.g., a communication process flow 215) that control electronic communications between a tenant and a set of users associated with the tenant. Further, to support collaboration, communication, and approvals, as well as reduced communication resource utilization, the communication platform 210 and the communication process flow management service 205 may be configured to communicate information and data. This cross-platform communication may be supported by APIs and other communication facilities.

In some examples, users associated with the tenant (e.g., a user 245) may use the communication process flow management service 205 to perform actions (e.g., actions 220) that include processor-executable instructions for management of electronic communications. For example, an action 220-a may include instructions that, when executed by a processor, selects users (e.g., customers) for the communication process flow 215. That is, the action 220-a may define a rule for determining whether users are to receive electronic communications in accordance with the communication process flow 215. The rule may be based on various attributes and behaviors (e.g., demographic information, web activity patterns, purchase history) of the users. For example, users that have purchased a product from the tenant (or an organization associated with the tenant) in the last six months may receive electronic communications from the tenant in accordance with the communication process flow 215. Users that do not satisfy this criteria may not receive electronic communications in accordance with the communication process flow 215.

Other actions 220 may define message transmission schemes, decision splits, and other related processes. For example, each user that satisfies a rule defined by the action 220-a may receive an email according to an action 220-b. The action 220-b may include specific content that is to be transmitted to the users (e.g., via email). Similarly, an action 220-c may define a decision split between users. For example, users that have opened an email corresponding to the action 220-b may be routed to an action 220-d, while users that have not opened the email corresponding to the action 220-b may be routed to an action 220-e. Additionally or alternatively, the action 220-c (e.g., a decision split) may utilize other attributes and behaviors to route users through the communication process flow 215.

The communication platform 210 may support a chat or instant messaging service used for various business functionalities. For example, teams associated with a tenant may use the communication platform 210 to manage communication process flows supported by the communication process flow management service 205, such as the communication process flow 215. These teams may use the communication platform 210 to discuss aspects of the communication process flow 215 or to make decisions regarding the communication process flow 215. For example, users of the communication platform 210 may use the communication platform 210 to discuss or implement edits or updates to the communication process flow 215.

The computing architecture 200 may support improved communication process flow approval management from the communication platform 210. To provide such improvements, the communication platform 210 may be configured with endpoints (e.g., a webhook or an application) and authorizations that enable the communication process flow management service 205 to transmit requests to the communication platform 210. These requests may include data objects (e.g., a data object 225) that are ingestible by the communication platform 210 for posting into one or more communication channels of the communication platform 210 (e.g., a communication channel corresponding to the communication process flow 215). For example, the communication platform 210 may receive a first request indicating the data object 225 that includes metadata associated with an update to an action (e.g., an action 220) of the communication process flow 215. The metadata may indicate that the user 245 of the communication platform 210 is to approve the update to the action.

In some examples, a user may manually enter an endpoint associated with a workspace (e.g., collection of communication channels) or a specific communication channel of the communication platform 210 into the communication process flow management service 205. In some cases, a user use an application that enables the user to interact with the communication platform 210. The application may include various authentication flows and setup flows to configure endpoints for the various services. When setting up the application, the user may log into an account for the communication process flow management service 205 to authenticate the user and to set up respective endpoints. After configuring the respective endpoints, these endpoints may be used to transmit requests for data objects (e.g., for posting into the communication platform 210). The entries (e.g., an entry 235) may be posted by a participant to the communication channel. In some cases, the participant may be an example of a bot or an artificial intelligence (AI) service that is configured to post entries into the communication channel.

In the examples of FIG. 2, the communication platform 210 may be configured to post an entry 235 into the channel corresponding to the communication process flow 215 based on receiving the request from the communication process flow management service 205. The entry 235 may display the metadata associated with the update and be configured to receive an indication of approval of the update from the user 245 (e.g., that is a participant to the channel). For example, the entry may display information about the update to the action, such as the name or title of the user who made the update (e.g., a marketing specialist, User-B), the title of the communication process flow 215 being updated, the particular action that is update, the changes to the action, or the like. In some examples, the entry may include a UI component that is configured to receive the indication of approval from the user 245 (e.g., an "Approve" button). In addition, the entry may include a UI component configured to receive an indication to view the update to the action in the communication process flow management service 205 (e.g., a "View" button).

Further, the communication platform 210 may be configured to transmit requests to the communication process flow management service 205. For example, the user 245 may enter a command or activate a UI component within the communication platform 210. In some cases, the UI component may enable a user to interact with the communication process flow 215 directly from the communication platform 210. For example, a user may approve an update to an action of the communication process flow 215 in response to an entry associated with the update being posted in the channel of the communication platform 210 associated with the communication process flow 215.

In some cases, the communication platform 210 may receive the indication of the approval of the update to the action from the user 245. For example, the user may select the UI component configured to receive the indication of approval (e.g., the "Approve" button) in the entry 235. In some examples, the user 245 may have correct permissions associated with their account to approve the update. For example, a set of permissions for approving the update to the action may be preconfigured at the communication process flow management service 205. As such, the user 245 may be configured to approve the update to the action of the communication process flow 215 based on the set of permissions (e.g., the user 245 may be an approver), while other users may also be configured with permissions to approve the update or may lack the permissions to approve the update (e.g., other users may seek approval for an update). Additionally or alternatively, the user 245 may be configured to approve different updates to actions for other communication process flows based on the set of permissions, or the user 245 may lack the permissions to update the other communication process flows. In some examples, the set of permissions may be based on an action type (e.g., an activity type) corresponding to the action. For example, a marketer or content creator may approve updates to emails and SMS messages for the communication process flow 215, and a data scientist may approve changes to a segment (e.g., a set of users) associated for the communication process flow 215.

In some cases, if a user that lacks the correct permissions to approve the update attempts to approve the update (e.g., selects the "Approve" button), the communication platform 210 may post an entry into the channel displaying a message indicating that the user lacks permission to approve the update. As such, the approval may fail unless the approving user has the correct permissions. In some cases, the communication platform 210 may display the UI component configured to receive the indication of the approval of the update to particular users who have the correct permissions. That is, the communication platform 210 may refrain from displaying the UI component to users who lack the correct permissions.

In some examples, instead of approving an update to an action of the communication process flow 215 from the channel of the communication platform 210 corresponding to the communication process flow 215, the user 245 may approve the update from a home channel of the communication platform 210. A home channel may be a channel of the communication platform 210 that is unique to each user account, and as such, may only be seen by the user associated with the account. For example, the communication platform 210 may post the entry 235 into the home channel and receive the indication of the approval of the update at the home channel. In some examples, the communication platform 210 may post multiple entries into the home channel of an approving user (e.g., the user 245) each with a UI component configured to receive the approval. As such, the user 245 may approve multiple updates all from the home channel.

Upon receiving the indication of the approval from the user 245, the communication platform 210 may generate a data object 240 that includes an indication of the action and an indication of the user 245. The indication of the action may include the approved edit or update, and the indication of the user 245 may indicate that the user 245 has the correct permissions to approve the update. Accordingly, the communication platform 210 may transmit a second request to the communication process flow management service 205 that includes the data object 240, where the second request may be configured to activate the update to the action. That is, the communication platform 210 may indicate to the communication process flow management service 205 that the update has been approved, and that the updated action to the communication process flow 215 may be activated. In some examples, the second request may also be configured to activate the communication process flow 215, and upon receiving the second request, the communication process flow management service 205 may activate the communication process flow 215 which includes the updated action. Other communication process flow approval techniques from the communication platform 210 are contemplated within the scope of the present disclosure.

As described in further detail herein, the permissions for approval (as well as other communication process flow interactions) may be maintained at the communication process flow management service 205, the communication platform 210, or both. For example, the communication process flow management service 205 may maintain a permissions configuration for teams, a communication platform, etc. The permissions may indicate which types of actions require approval for updates, which types of changes require approval, which users require approval for changes, or a combination of these. Accordingly, any requested interaction with the communication process flow 215 (e.g., via requests received from the communication platform) may be checked for correct permissions. That is, the communication process flow management service 205 may determine whether the user indicated by the data object 240 has the correct permissions to interact with the communication process flow 215. If not, the communication process flow management service 205 may transmit a responsive request that indicates that the user is not authorized. Similar techniques may be performed by the communication platform 210.

Further, the UI components for approving changes (as well as other UI components) may be displayed to users in the communication platform 210 based on the permissions associated with the users. For example, the data object 225 may be configured to display the UI component to some users, and not to other users, based on the permissions. Or the communication platform 210 may determine to display the UI component or not, to various users, based on the permission of users of the communication platform.

Figure 3:
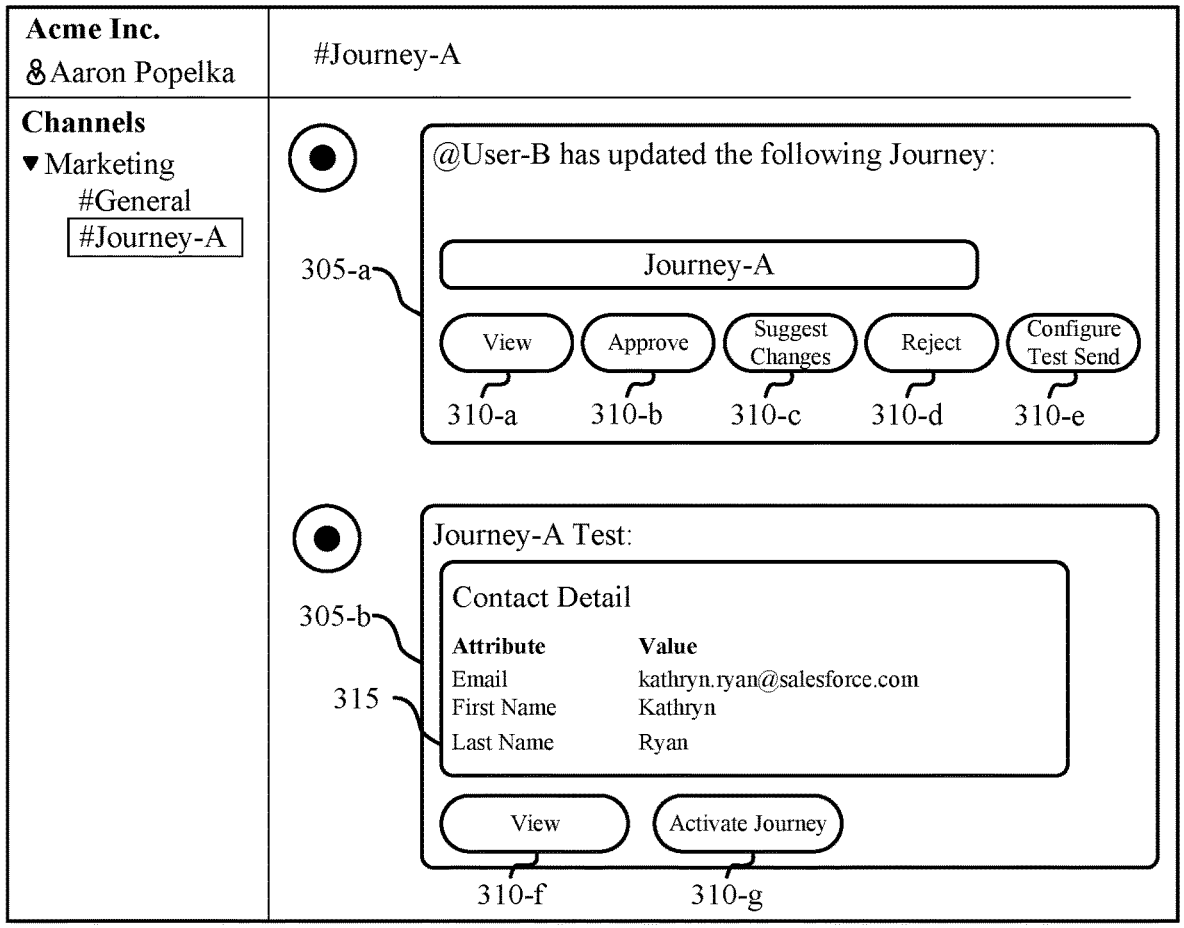
FIG. 3 illustrates an example of a user interface (UI) that supports techniques for communication process flow approval management in accordance with aspects of the present disclosure.

FIG. 3 illustrates an example of a UI 300 that supports techniques for communication process flow approval management in accordance with aspects of the present disclosure. The UI 300 may implement or be implemented by aspects of the data processing system 100 or the computing architecture 200. For example, the UI 300 may be included in a communication platform as described with reference to FIG. 2. The UI 300 may be used in a channel corresponding to a communication process flow, and may include multiple entries 305. In addition, the UI 300 may correspond to a user with permissions to approve an update to an action of the communication process flow (e.g., an approver).

As described herein, a communication platform may be configured to transmit and receive requests to and from a communication process flow management service. For example, a user may enter a command or activate a UI component within the communication platform via the UI 300, which may enable the use to interact with a communication process flow directly from the communication platform. In some examples, after receiving a first request from the communication process flow management service indicating a first data object including metadata associated with an update to an action of the communication process flow, the communication platform may post an entry 305-a into the UI 300. The entry 305-a may display the metadata associated with the update. For example, the entry 305-a may display the name of a user who made the update (e.g., User-B), the time at which the user made the update, the type of action that is updated, a name of the corresponding communication process flow (e.g., Journey-A), the particular action that is update, the changes to the action, or any other information associated with the update.

In some examples, the entry 305-a may include multiple UI components 310, which may be configured to receive an particular indication from a user. For example, the entry 305-a may include a UI component 310-a configured to receive an indication to view the update in the communication process flow management service (e.g., a "View" button), a UI component 310-b configured to receive an indication of approval of the update (e.g., an "Approve" button), a UI component 310-c configured to receive an indication of suggested changes to the update (e.g., a "Suggest Changes" button), a UI component 310-d configured to receive an indication of a rejection of the update (e.g., a "Reject" button), a UI component 310-e configured to receive an indication to test the update (e.g., a "Configure Test Send" button), or any combination thereof. The entry 305-a may also include other UI components 310 configured to receive other indications from a user that may impact the communication process flow. For example, if the user is an approver (e.g., configured with permissions enabling the user to approve an update), the user may select the UI component 310-b to indicate approval of the update detailed in the entry 305-a.

In some examples, the user may select the UI component 310-e to configure a test of the updated action of the communication process flow before activating the communication process flow. For example, the action may include sending an email, and the update to the action may include updating information in the email. Upon selecting the UI component 310-e, the user may input a set of email addresses to send the test email to, a date on which to perform the test, personalization strings (e.g., a first name and a last name corresponding to each email), or any combination thereof to configure the test. The communication platform may transmit a data object including the set of email addresses, the date, the personalization strings, or any combination thereof to the communication process flow management service such that the test may be performed according to the configuration defined by the user.

In response to transmitting the data object, the communication platform may receive a second data object from the communication process flow management service that may include an indication of results of the test. The communication platform may post an entry 305-b to the channel (e.g., corresponding to UI 300) that includes an indication of the results of the test based on receiving the second data object.

The entry 305-b may include contact details 315 that correspond to the information stored in the data object (e.g., different attributes and corresponding values). For example, the contact details 315 may include an email the test was sent to and a first name and a last name corresponding to the email (e.g., personalization strings). In addition, the entry 305-b may indicate the time at which the test was performed and a name of the corresponding communication process flow. The entry 305-b may be visible to users having a set of permissions enabling the users to approve the update (e.g., approvers).

In some cases, the entry 305-b may also include a UI component 310-f configured to receive an indication to view the test results in the communication process flow management service (e.g., a "View" button), a UI component 310-g configured to receive an indication to activate the communication process flow (e.g., an "Activate Journey" button), or both. If the user determines that the results of the test are satisfactory, and if the user has approved the update to the action which was tested, then the user may select the UI component 310-g to activate the communication process flow. As such, the user may configure a test send of the updated action and activate the corresponding communication process flow directly from the communication platform without navigating to and interacting with the communication process flow management service.

In some examples, the UI components 310 may be displayed to users or participants to the channel based on the permissions associated with the participants. For example, the UI component 310-b may be displayed to users that have the permissions to approve updates or changes to a communication process flow and may not be displayed to those users that do not have permissions to approve updates. Some UI components 310 may be displayed to each user (e.g., view, suggest, configure test send). In some examples, the UI components 310 may be displayed to each user of the channel, but only some users have permission to interact with the communication process flow using the UI components 310. For example, a user may activate the approve UI component 310-b, and a communication (e.g., request) with an object may be transmitted to the communication process flow management service. The communication process flow management service may analyze the object to determine if the activating user has permission to approve. If the communication process flow management service determines that the user does not have permission, the service may return an object that is configured to post an entry indicating lack of permission, configured to activate a modal that indicates that the user does not have permission, or configured to activate another UI indication. Thus, the permissions may be managed by the communication process flow management service, the communication platform, or both.

Figure 4:
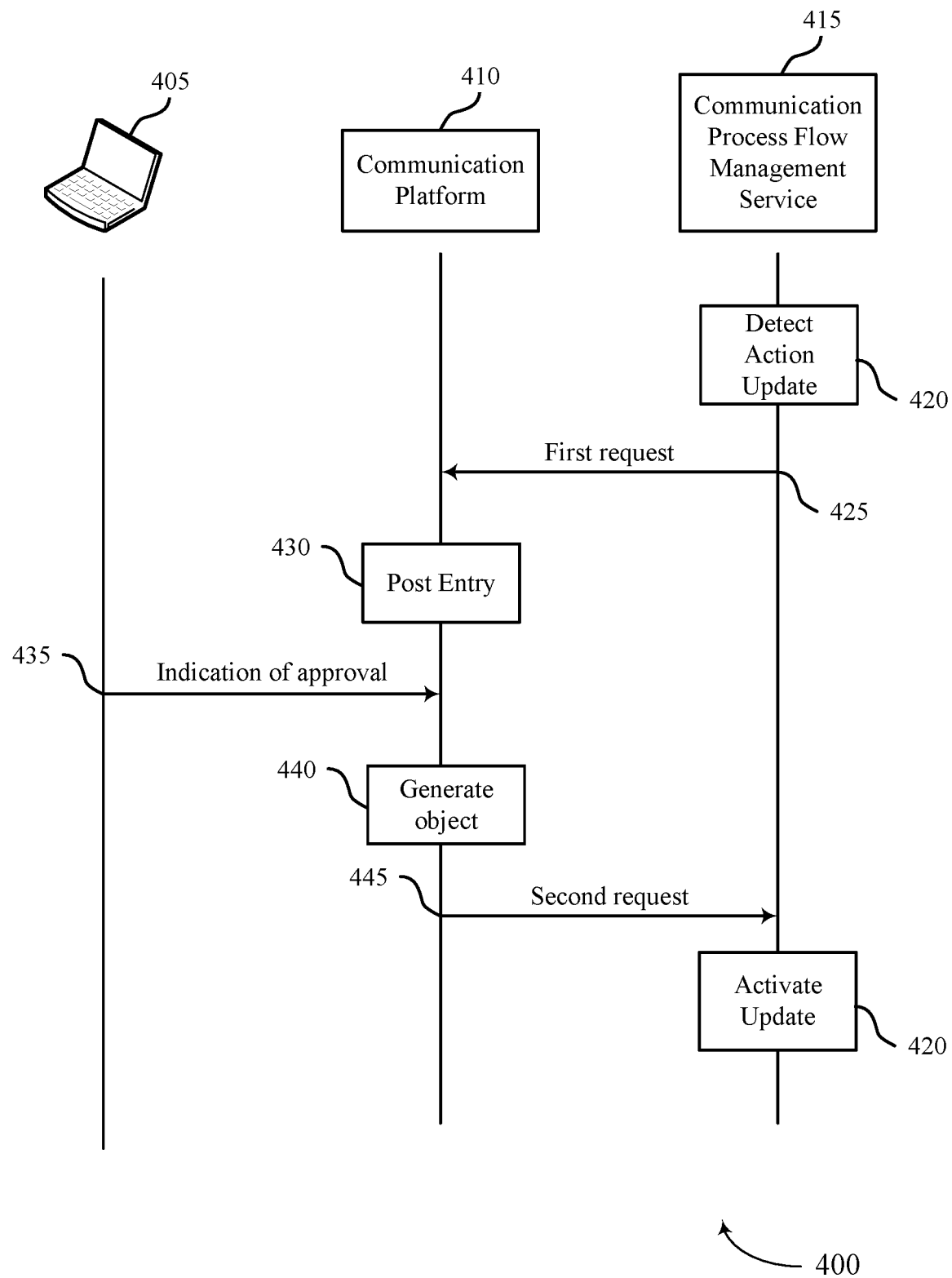
FIG. 4 illustrates an example of a process flow that supports techniques for communication process flow approval management in accordance with aspects of the present disclosure.

FIG. 4 illustrates an example of a process flow 400 that supports techniques for communication process flow approval management in accordance with aspects of the present disclosure. The process flow 400 may implement or be implemented by aspects of the data processing system 100 or the computing architecture 200. For example, the process flow 400 may include a user device 405 corresponding to a user, a communication platform 410, and a communication process flow management service 415, which may be examples of corresponding services and platforms described with reference to FIGS. 1 and 2. In the following description of the process flow 400, operations between the user device 405, the communication platform 410, and the communication process flow management service 415 may be performed in a different order or at a different time than as shown. Additionally or alternatively, some operations may be omitted from the process flow 400, and other operations may be added to the process flow 400. The process flow 400 may support techniques for improved communication process flow approval management based on enabling a user to approve updates to an action for a communication process flow directly from the communication platform 410.

At 420, the communication process flow management service 415 may detect that an action of a communication process flow has been updated. For example, the communication process flow management service 415 may detect that configurations for one or more actions have been changed (e.g., based on a save indication). In such cases, the communication process flow management service 415 may retrieve permission configurations to determine whether the change is to be approved. For example, changes to certain action types, types of changes, or changes by certain users may be required to be approved based on a permission configuration.

At 425, the communication platform 410 may receive a first request, from the communication process flow management service 415 supporting a communication process flow, indicating a first data object that includes metadata associated with an update to an action of the communication process flow. The metadata may indicate that a user of the communication platform is to approve the update to the action. In some examples, an action may include message transmission schemes, decision splits, and other related processes, such as editing or sending an email. In some examples, a user may update an action, and may seek approval for that update before activating it in the communication process flow. In some examples, the communication process flow management service may automatically send the request based on the update, based on the user making the update, based on permissions associated with the user, the action, or both, or based on some other configuration.

At 430, the communication platform 410 may post an entry into a channel of the communication platform based on receiving the first request, where the entry may display the metadata associated with the update and may be configured to receive an indication of approval of the update from the user that is a participant to the channel. For example, the entry may include information associated with the update, such as who performed the update, when the update was performed, and the like. In addition, the entry may include multiple UI components (e.g., buttons) which may be configured to receive an indication from the user. For example, the entry may include a UI component configured to receive the indication of approval of the update (e.g., an "Approve" button).

At 435, the communication platform 410 may receive an indication of the approval of the update to the action of the communication process flow from the user and via the user device 405. For example, the user may select the UI component configured to receive the indication of the approval of the update, which may indicate the approval to the communication platform 410. Additionally or alternatively, the user may transmit a different indication to the communication platform 410, for example, an indication to configure a test send of the updated action before approving it. In order to approve the update to the action, the user may have particular permissions (e.g., the user may have approver permissions).

At 440, based on receiving the indication of the approval of the update, the communication platform 410 may generate a second data object that includes an indication of the action and an indication of the user. That is, the second data object may indicate that the update to the action was successfully approved given the user has the permissions of an approver.

At 445, the communication platform 410 may transmit, to the communication process flow management service 415 supporting the communication process flow, a second request that includes the second data object, where the second request is configured to activate the update to the action of the communication process flow. Put another way, the communication platform 410 may transmit an indication to the communication process flow management service 415 that the update to the action has been successfully approved. As such, the user may approve the update to the action of the communication process flow (e.g., which is supported by the communication process flow management service) directly from the communication platform 410. In some examples, the second request may be configured to activate the communication process flow based on receiving the indication of the approval.

At 450, the communication process flow management service 415 may activate the update to the action at the communication process flow. Activating the update may include saving the configurations (e.g., updated configurations) such that the configurations are applied to communications controlled by the communication process flow. Before the update is activated, the communication process flow may use prior configurations (e.g., configurations that were applied before the update).

The techniques described in the process flow 400 may enable users of the communication platform 410 to approve updates to actions of a communication process flow directly from the communication platform 410, which may improve the efficiency and user satisfaction of communication process flow approval management. For example, users of the communication platform 410 may indicate approval or other actions associated with the communication process flow from within the communication platform 410 instead of navigating to the communication process flow management service 415 and interacting with a UI associated with the communication process flow management service 415. As such, the techniques described in the process flow 400 may result in improved workflow efficiency, greater cross-platform compatibility, and higher user satisfaction, among other benefits.

Figure 5:
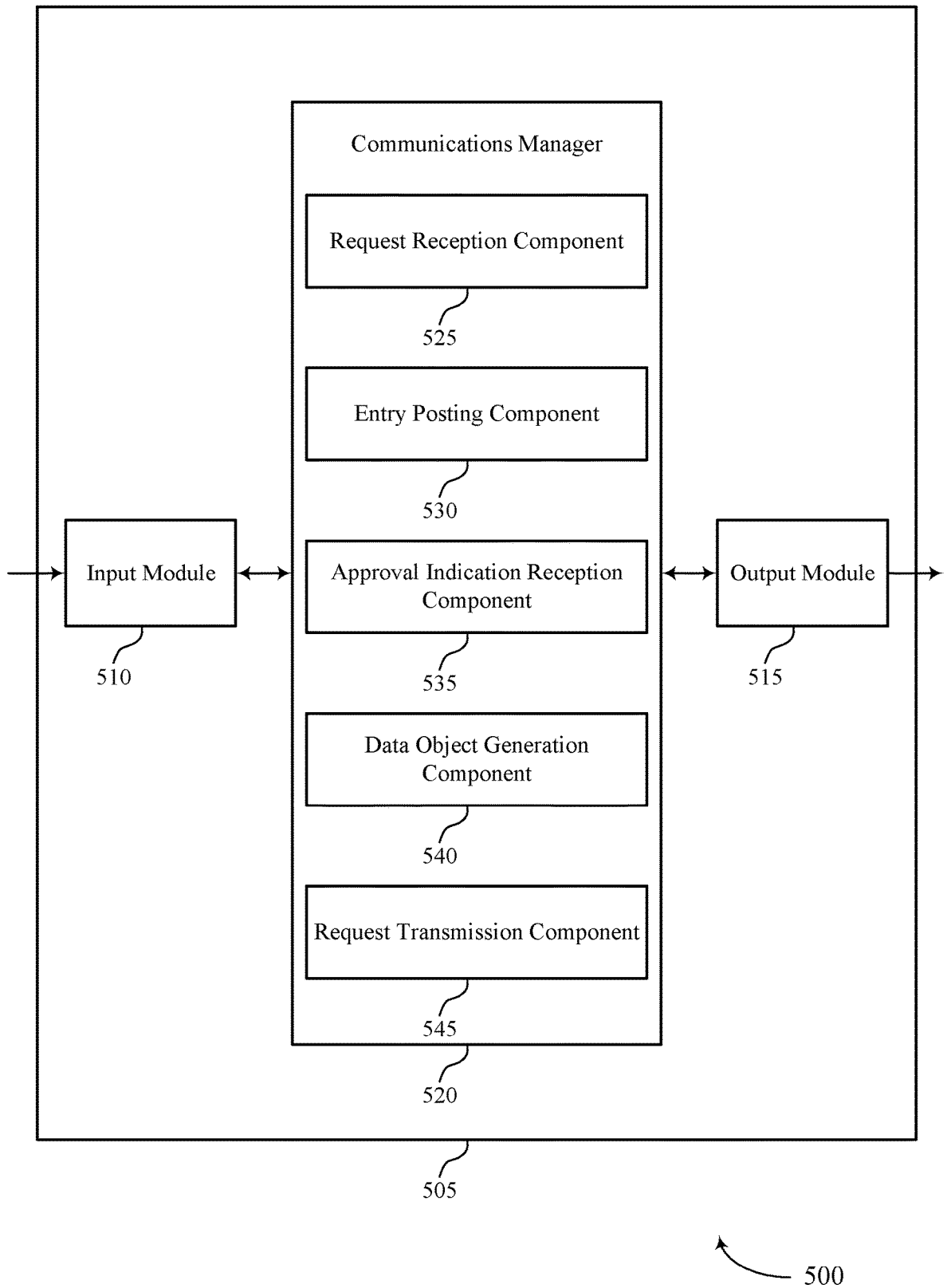
FIG. 5 shows a block diagram of an apparatus that supports techniques for communication process flow approval management in accordance with aspects of the present disclosure.

FIG. 5 shows a block diagram 500 of a device 505 that supports techniques for communication process flow approval management in accordance with aspects of the present disclosure. The device 505 may include an input module 510, an output module 515, and a communications manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the communications manager 520 to support techniques for communication process flow approval management. In some cases, the input module 510 may be a component of an I/O controller 710 as described with reference to FIG. 7.

The output module 515 may manage output signals for the device 505. For example, the output module 515 may receive signals from other components of the device 505, such as the communications manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the communications manager 520 may include a request reception component 525, an entry posting component 530, an approval indication reception component 535, a data object generation component 540, a request transmission component 545, or any combination thereof. In some examples, the communications manager 520, or various components thereof, may be configured to perform various operations (e.g., receiving, monitoring, transmitting) using or otherwise in cooperation with the input module 510, the output module 515, or both. For example, the communications manager 520 may receive information from the input module 510, send information to the output module 515, or be integrated in combination with the input module 510, the output module 515, or both to receive information, transmit information, or perform various other operations as described herein.

The communications manager 520 may support data processing in accordance with examples as disclosed herein. The request reception component 525 may be configured as or otherwise support a means for receiving, at a communication platform, a first request indicating a first data object that comprises metadata associated with an update to an action of a communication process flow, wherein the metadata indicates a user of the communication platform is to approve the update to the action. The entry posting component 530 may be configured as or otherwise support a means for posting, based at least in part on receiving the first request, an entry into a channel of the communication platform, the entry displaying the metadata associated with the update and configured to receive an indication of approval of the update from the user that is a participant to the channel. The approval indication reception component 535 may be configured as or otherwise support a means for receiving, at the communication platform and from the user, the indication of the approval of the update to the action of the communication process flow. The data object generation component 540 may be configured as or otherwise support a means for generating, based at least in part on receiving the indication of the approval, a second data object that includes an indication of the action and an indication of the user. The request transmission component 545 may be configured as or otherwise support a means for transmitting a second request that includes the second data object, wherein the second request is configured to activate the update to the action of the communication process flow.

Figure 6:
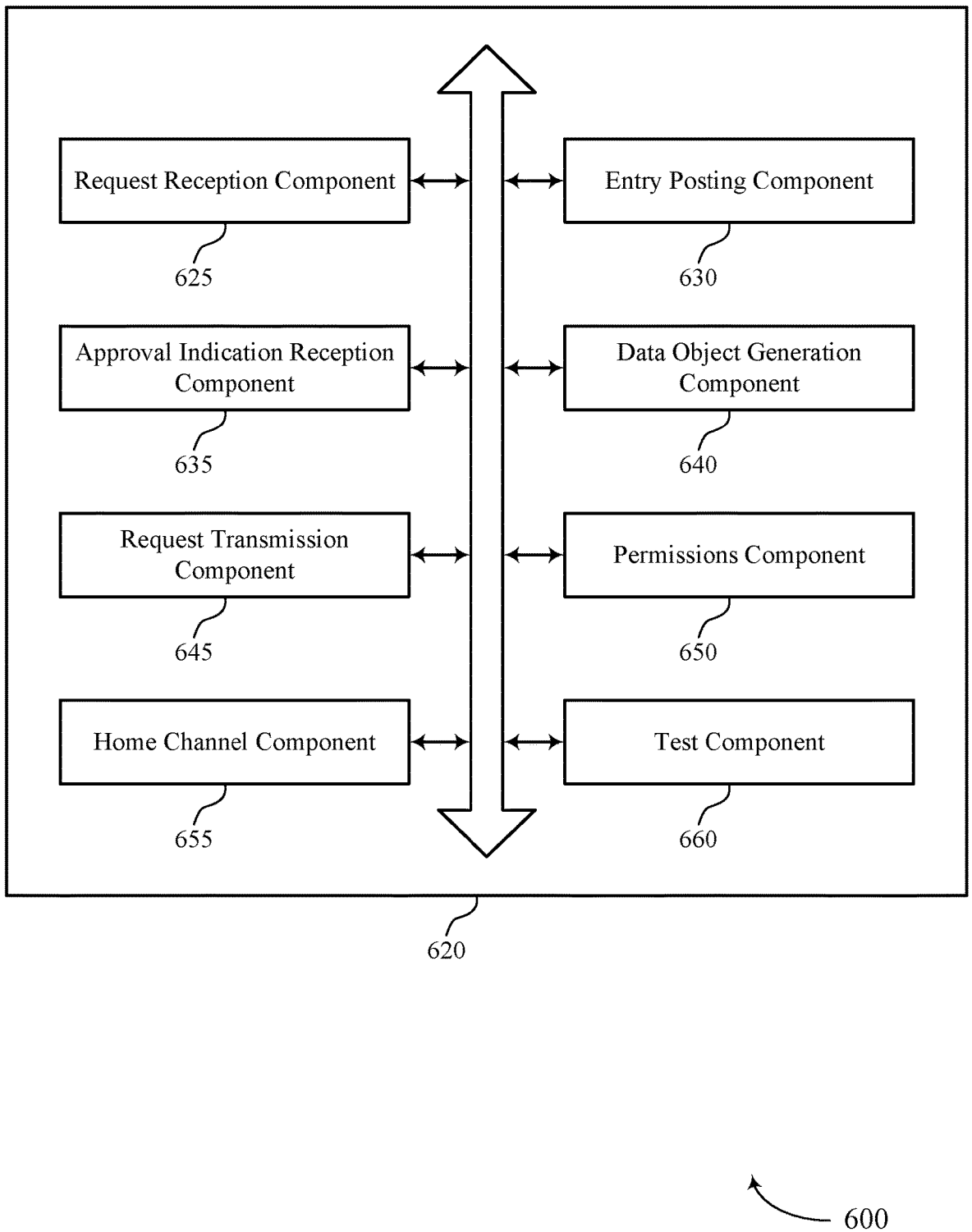
FIG. 6 shows a block diagram of a communications manager that supports techniques for communication process flow approval management in accordance with aspects of the present disclosure.

FIG. 6 shows a block diagram 600 of a communications manager 620 that supports techniques for communication process flow approval management in accordance with aspects of the present disclosure. The communications manager 620 may be an example of aspects of a communications manager or a communications manager 520, or both, as described herein. The communications manager 620, or various components thereof, may be an example of means for performing various aspects of techniques for communication process flow approval management as described herein. For example, the communications manager 620 may include a request reception component 625, an entry posting component 630, an approval indication reception component 635, a data object generation component 640, a request transmission component 645, a permissions component 650, a home channel component 655, a test component 660, or any combination thereof. Each of these components may communicate, directly or indirectly, with one another (e.g., via one or more buses).

The communications manager 620 may support data processing in accordance with examples as disclosed herein. The request reception component 625 may be configured as or otherwise support a means for receiving, at a communication platform, a first request indicating a first data object that comprises metadata associated with an update to an action of a communication process flow, wherein the metadata indicates a user of the communication platform is to approve the update to the action. The entry posting component 630 may be configured as or otherwise support a means for posting, based at least in part on receiving the first request, an entry into a channel of the communication platform, the entry displaying the metadata associated with the update and configured to receive an indication of approval of the update from the user that is a participant to the channel. The approval indication reception component 635 may be configured as or otherwise support a means for receiving, at the communication platform and from the user, the indication of the approval of the update to the action of the communication process flow. The data object generation component 640 may be configured as or otherwise support a means for generating, based at least in part on receiving the indication of the approval, a second data object that includes an indication of the action and an indication of the user. The request transmission component 645 may be configured as or otherwise support a means for transmitting a second request that includes the second data object, wherein the second request is configured to activate the update to the action of the communication process flow.

In some examples, to support transmitting the second request, the request transmission component 645 may be configured as or otherwise support a means for transmitting the second request that is configured to activate the communication process flow based at least in part on receiving the indication of the approval.

In some examples, the permissions component 650 may be configured as or otherwise support a means for receiving, from a communication process flow management service, an indication of a set of permissions for approving the update to the action, wherein the user is configured to approve the update based at least in part on the set of permissions. In some examples, the set of permissions is based at least in part on an action type of the action.

In some examples, the permissions component 650 may be configured as or otherwise support a means for posting, based at least in part on receiving the indication of the approval, an entry into the channel of the communication platform displaying a message indicating that the user lacks permission to approve the update.

In some examples, to support posting the entry into the channel of the communication platform, the entry posting component 630 may be configured as or otherwise support a means for posting the entry comprising a user interface component configured to receive the indication of the approval of the update. In some examples, the entry comprises the user interface component based at least in part on a set of permissions for approving the update to the action.

In some examples, the home channel component 655 may be configured as or otherwise support a means for posting, based at least in part on receiving the first request, the entry into a home channel of the communication platform, the entry displaying the metadata associated with the update and configured to receive the indication of approval of the update from the user. In some examples, the home channel component 655 may be configured as or otherwise support a means for receiving, at the home channel of the communication platform and from the user, the indication of the approval of the update to the action of the communication process flow.

In some examples, the entry is configured to receive an indication of approval of the update, an indication to view the update in a communication process flow management service, an indication of suggested changes to the update, an indication of a rejection of the update, an indication to test the update, or any combination thereof, from the user.

In some examples, the test component 660 may be configured as or otherwise support a means for receiving, at the communication platform and from the user, an indication to test the update to the action of the communication process flow. In some examples, the test component 660 may be configured as or otherwise support a means for transmitting, based at least in part on receiving the indication to test the update, a third data object that comprises a plurality of emails, a date on which to perform the test, personalization strings, or any combination thereof.

In some examples, the test component 660 may be configured as or otherwise support a means for receiving, based at least in part on transmitting the third data object, a fourth data object that includes an indication of results of the test. In some examples, the test component 660 may be configured as or otherwise support a means for posting, based at least in part on receiving the fourth data object, a second entry that includes the indication of the results of the test.

In some examples, to support transmitting the second request, the request reception component 625 may be configured as or otherwise support a means for transmitting, to a communication process flow management service supporting the communication process flow, the second request that includes the second data object, wherein the second request is configured to activate the update to the action of the communication process flow.

Figure 7:
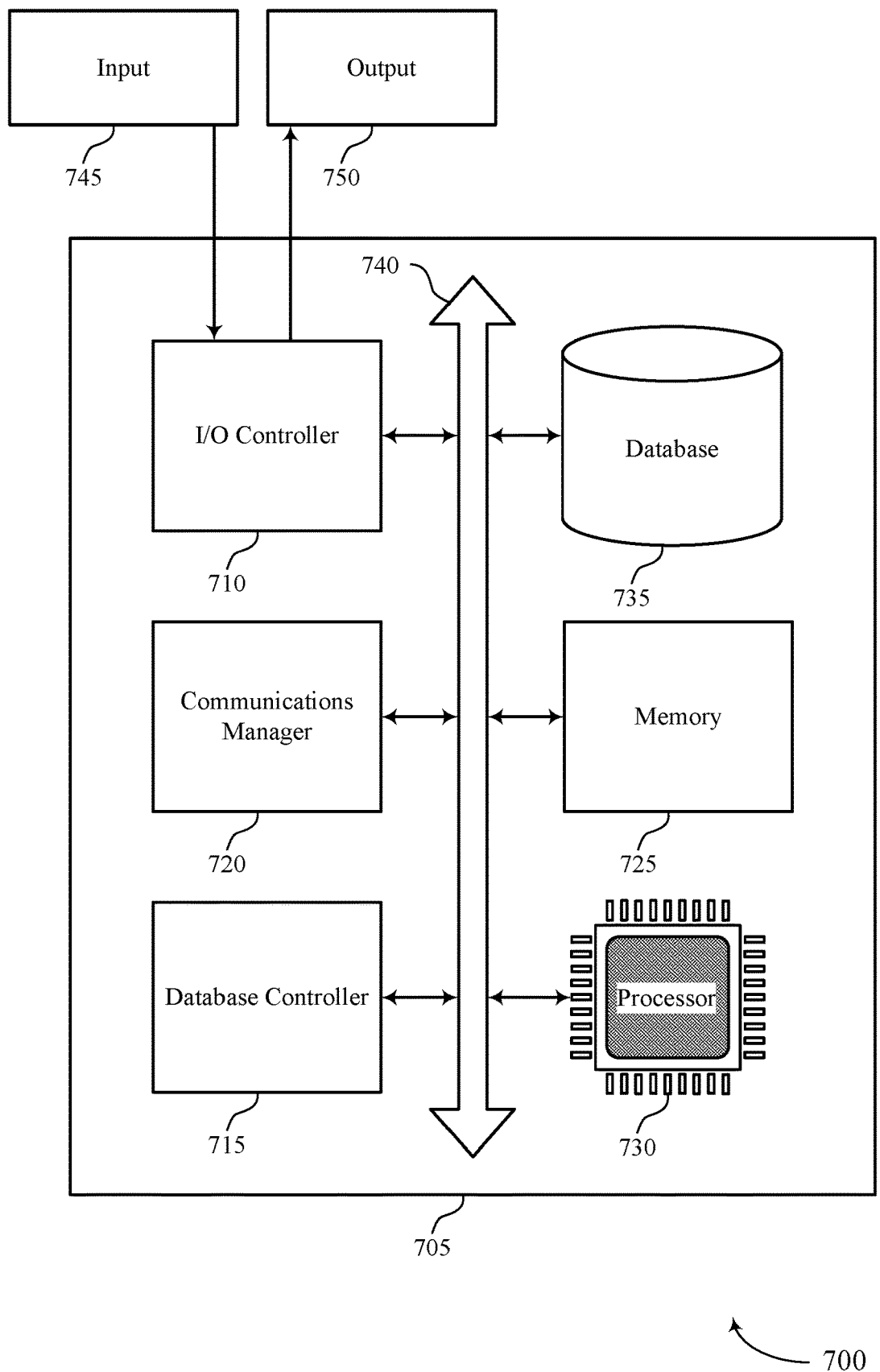
FIG. 7 shows a diagram of a system including a device that supports techniques for communication process flow approval management in accordance with aspects of the present disclosure.

FIG. 7 shows a diagram of a system 700 including a device 705 that supports techniques for communication process flow approval management in accordance with aspects of the present disclosure. The device 705 may be an example of or include the components of a device 505 as described herein. The device 705 may include components for bi-directional data communications including components for transmitting and receiving communications, such as a communications manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for communication process flow approval management).

The communications manager 720 may support data processing in accordance with examples as disclosed herein. For example, the communications manager 720 may be configured as or otherwise support a means for receiving, at a communication platform, a first request indicating a first data object that comprises metadata associated with an update to an action of a communication process flow, wherein the metadata indicates a user of the communication platform is to approve the update to the action. The communications manager 720 may be configured as or otherwise support a means for posting, based at least in part on receiving the first request, an entry into a channel of the communication platform, the entry displaying the metadata associated with the update and configured to receive an indication of approval of the update from the user that is a participant to the channel. The communications manager 720 may be configured as or otherwise support a means for receiving, at the communication platform and from the user, the indication of the approval of the update to the action of the communication process flow. The communications manager 720 may be configured as or otherwise support a means for generating, based at least in part on receiving the indication of the approval, a second data object that includes an indication of the action and an indication of the user. The communications manager 720 may be configured as or otherwise support a means for transmitting a second request that includes the second data object, wherein the second request is configured to activate the update to the action of the communication process flow.

By including or configuring the communications manager 720 in accordance with examples as described herein, the device 705 may support techniques for improved communication process flow approval management, which may enable a user to approve an update to an action of a communication process flow directly from a communication platform. As such, the described techniques may support improved efficiencies, as a user may limit switching back and forth from a communication process flow management service and a communication platform. In addition, the described techniques may support increased user satisfaction as users may receive approval for changes and assurance that the changes are agreed upon by colleagues.

Figure 8:
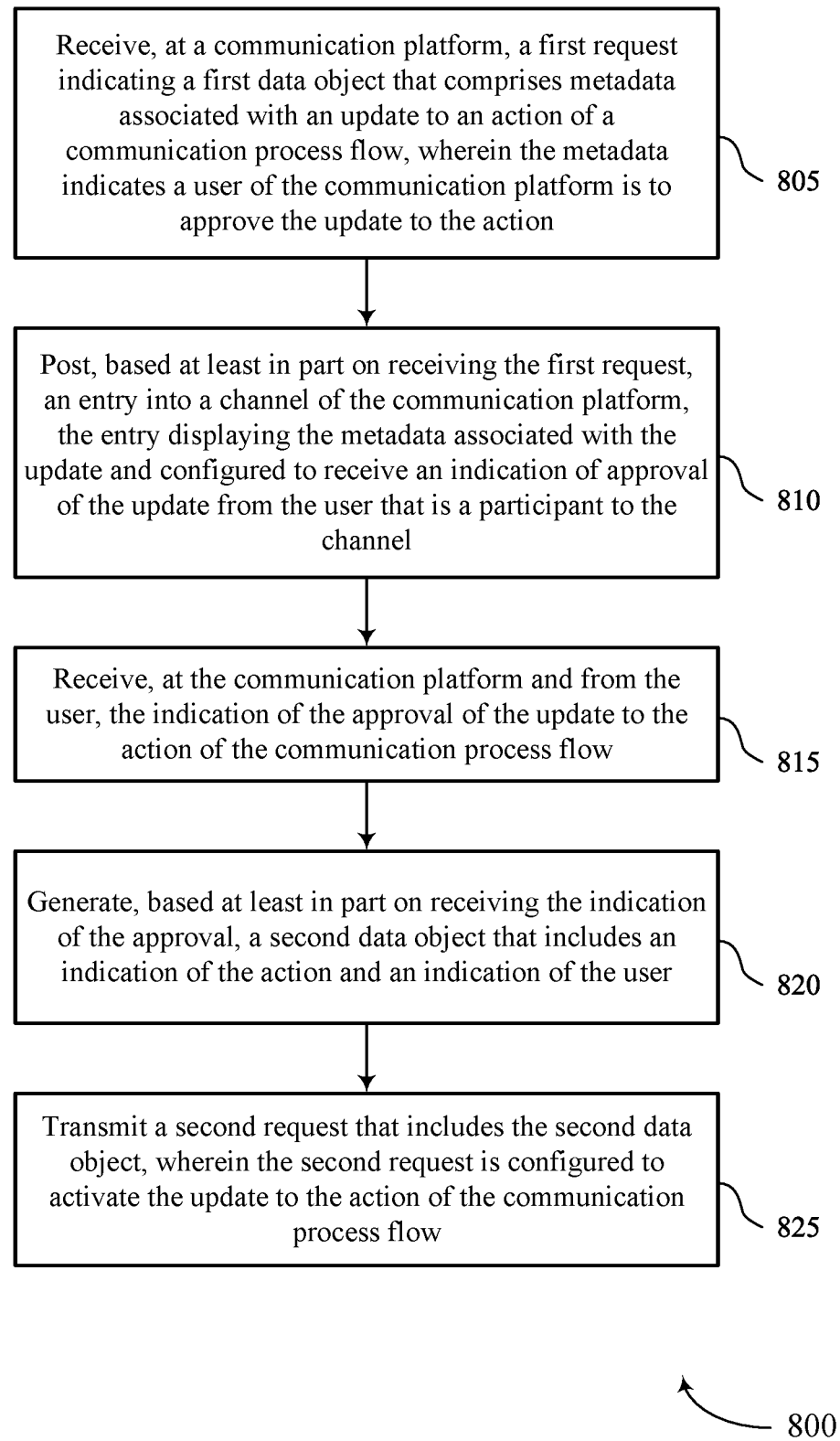
FIGS. 8 through 10 show flowcharts illustrating methods that support techniques for communication process flow approval management in accordance with aspects of the present disclosure.

FIG. 8 shows a flowchart illustrating a method 800 that supports techniques for communication process flow approval management in accordance with aspects of the present disclosure. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 805, the method may include receiving, at a communication platform, a first request indicating a first data object that comprises metadata associated with an update to an action of a communication process flow, wherein the metadata indicates a user of the communication platform is to approve the update to the action. The operations of 805 may be performed in accordance with examples as disclosed herein. In some examples, aspects of the operations of 805 may be performed by a request reception component 625 as described with reference to FIG. 6.

At 810, the method may include posting, based at least in part on receiving the first request, an entry into a channel of the communication platform, the entry displaying the metadata associated with the update and configured to receive an indication of approval of the update from the user that is a participant to the channel. The operations of 810 may be performed in accordance with examples as disclosed herein. In some examples, aspects of the operations of 810 may be performed by an entry posting component 630 as described with reference to FIG. 6.

At 815, the method may include receiving, at the communication platform and from the user, the indication of the approval of the update to the action of the communication process flow. The operations of 815 may be performed in accordance with examples as disclosed herein. In some examples, aspects of the operations of 815 may be performed by an approval indication reception component 635 as described with reference to FIG. 6.

At 820, the method may include generating, based at least in part on receiving the indication of the approval, a second data object that includes an indication of the action and an indication of the user. The operations of 820 may be performed in accordance with examples as disclosed herein. In some examples, aspects of the operations of 820 may be performed by a data object generation component 640 as described with reference to FIG. 6.

At 825, the method may include transmitting a second request that includes the second data object, wherein the second request is configured to activate the update to the action of the communication process flow. The operations of 825 may be performed in accordance with examples as disclosed herein. In some examples, aspects of the operations of 825 may be performed by a request transmission component 645 as described with reference to FIG. 6.

Figure 9:
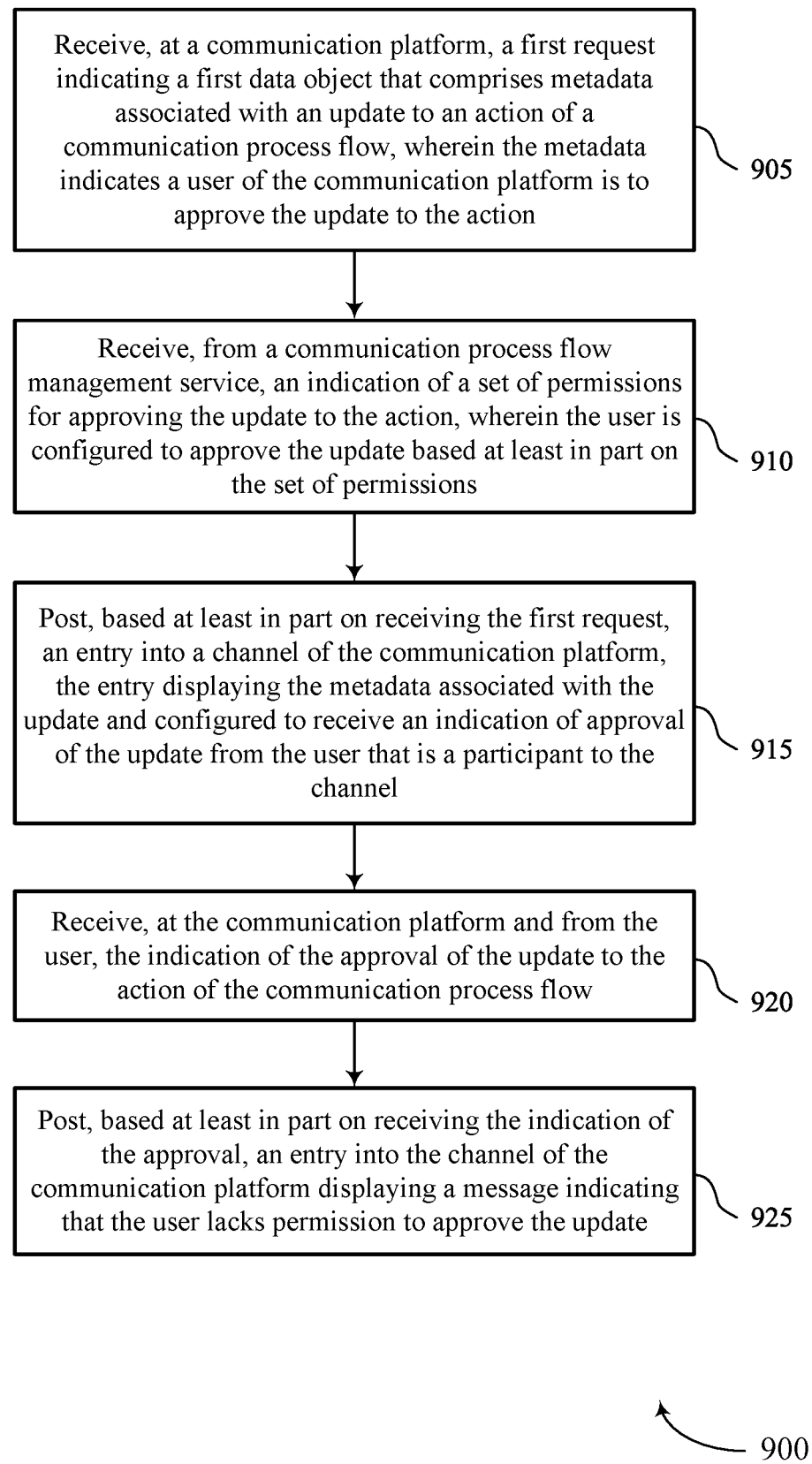

FIG. 9 shows a flowchart illustrating a method 900 that supports techniques for communication process flow approval management in accordance with aspects of the present disclosure. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 905, the method may include receiving, at a communication platform, a first request indicating a first data object that comprises metadata associated with an update to an action of a communication process flow, wherein the metadata indicates a user of the communication platform is to approve the update to the action. The operations of 905 may be performed in accordance with examples as disclosed herein. In some examples, aspects of the operations of 905 may be performed by a request reception component 625 as described with reference to FIG. 6.

At 910, the method may include receiving, from a communication process flow management service, an indication of a set of permissions for approving the update to the action, wherein the user is configured to approve the update based at least in part on the set of permissions. The operations of 910 may be performed in accordance with examples as disclosed herein. In some examples, aspects of the operations of 910 may be performed by a permissions component 650 as described with reference to FIG. 6.

At 915, the method may include posting, based at least in part on receiving the first request, an entry into a channel of the communication platform, the entry displaying the metadata associated with the update and configured to receive an indication of approval of the update from the user that is a participant to the channel. The operations of 915 may be performed in accordance with examples as disclosed herein. In some examples, aspects of the operations of 915 may be performed by an entry posting component 630 as described with reference to FIG. 6.

At 920, the method may include receiving, at the communication platform and from the user, the indication of the approval of the update to the action of the communication process flow. The operations of 920 may be performed in accordance with examples as disclosed herein. In some examples, aspects of the operations of 920 may be performed by an approval indication reception component 635 as described with reference to FIG. 6.

At 925, the method may include posting, based at least in part on receiving the indication of the approval, an entry into the channel of the communication platform displaying a message indicating that the user lacks permission to approve the update. The operations of 925 may be performed in accordance with examples as disclosed herein. In some examples, aspects of the operations of 925 may be performed by a permissions component 650 as described with reference to FIG. 6.

Figure 10:
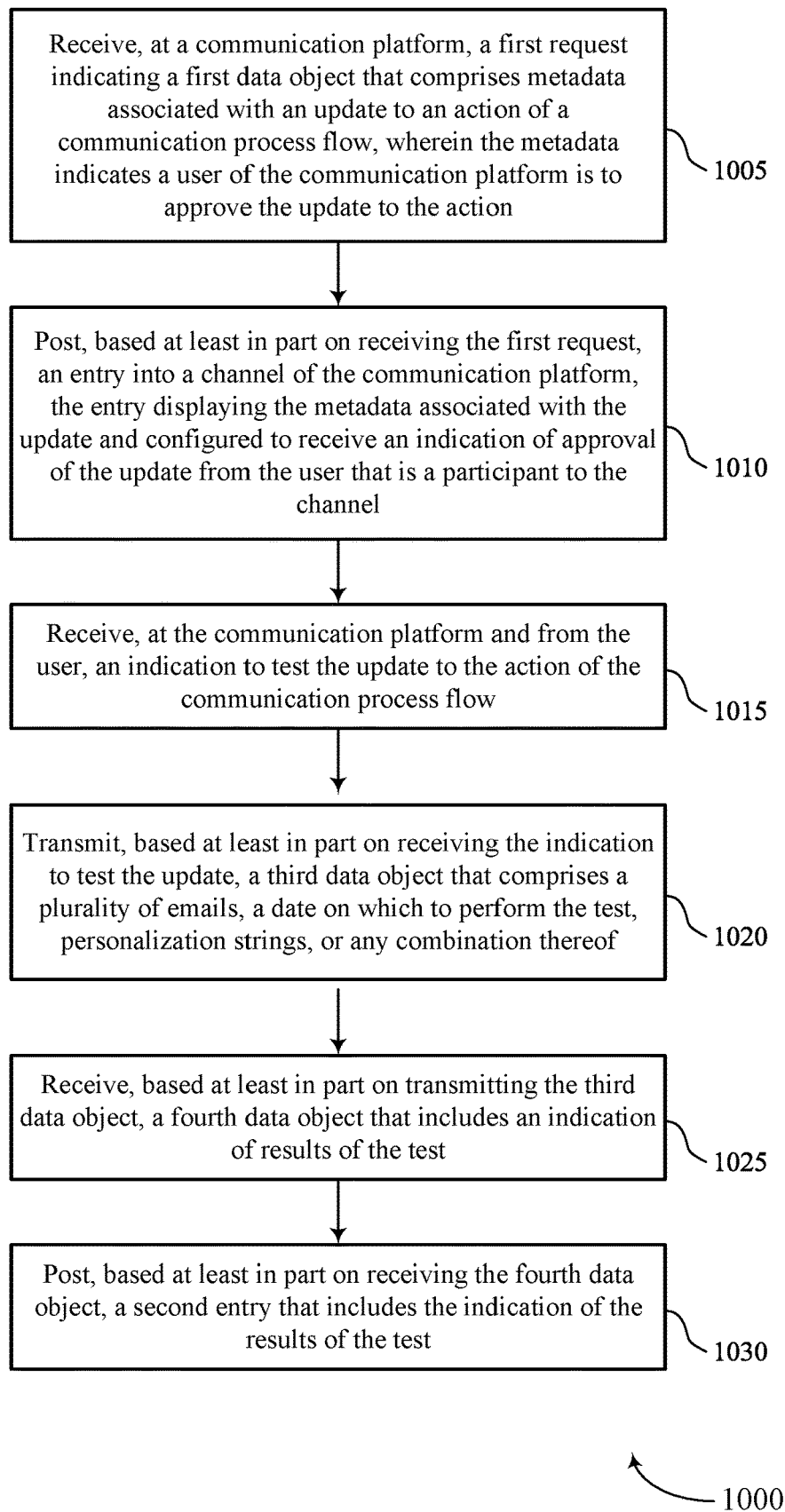

FIG. 10 shows a flowchart illustrating a method 1000 that supports techniques for communication process flow approval management in accordance with aspects of the present disclosure. The operations of the method 1000 may be implemented by an application server or its components as described herein. For example, the operations of the method 1000 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 1005, the method may include receiving, at a communication platform, a first request indicating a first data object that comprises metadata associated with an update to an action of a communication process flow, wherein the metadata indicates a user of the communication platform is to approve the update to the action. The operations of 1005 may be performed in accordance with examples as disclosed herein. In some examples, aspects of the operations of 1005 may be performed by a request reception component 625 as described with reference to FIG. 6.

At 1010, the method may include posting, based at least in part on receiving the first request, an entry into a channel of the communication platform, the entry displaying the metadata associated with the update and configured to receive an indication of approval of the update from the user that is a participant to the channel. The operations of 1010 may be performed in accordance with examples as disclosed herein. In some examples, aspects of the operations of 1010 may be performed by an entry posting component 630 as described with reference to FIG. 6.

At 1015, the method may include receiving, at the communication platform and from the user, an indication to test the update to the action of the communication process flow. The operations of 1015 may be performed in accordance with examples as disclosed herein. In some examples, aspects of the operations of 1015 may be performed by a test component 660 as described with reference to FIG. 6.

At 1020, the method may include transmitting, based at least in part on receiving the indication to test the update, a third data object that comprises a plurality of emails, a date on which to perform the test, personalization strings, or any combination thereof. The operations of 1020 may be performed in accordance with examples as disclosed herein. In some examples, aspects of the operations of 1020 may be performed by a test component 660 as described with reference to FIG. 6.

At 1025, the method may include receiving, based at least in part on transmitting the third data object, a fourth data object that includes an indication of results of the test. The operations of 1025 may be performed in accordance with examples as disclosed herein. In some examples, aspects of the operations of 1025 may be performed by a test component 660 as described with reference to FIG. 6.

At 1030, the method may include posting, based at least in part on receiving the fourth data object, a second entry that includes the indication of the results of the test. The operations of 1030 may be performed in accordance with examples as disclosed herein. In some examples, aspects of the operations of 1030 may be performed by a test component 660 as described with reference to FIG. 6.

A method for data processing is described. The method may include receiving, at a communication platform, a first request indicating a first data object that comprises metadata associated with an update to an action of a communication process flow, wherein the metadata indicates a user of the communication platform is to approve the update to the action, posting, based at least in part on receiving the first request, an entry into a channel of the communication platform, the entry displaying the metadata associated with the update and configured to receive an indication of approval of the update from the user that is a participant to the channel, receiving, at the communication platform and from the user, the indication of the approval of the update to the action of the communication process flow, generating, based at least in part on receiving the indication of the approval, a second data object that includes an indication of the action and an indication of the user, and transmitting a second request that includes the second data object, wherein the second request is configured to activate the update to the action of the communication process flow.

An apparatus for data processing is described. The apparatus may include a processor, memory coupled with the processor, and instructions stored in the memory. The instructions may be executable by the processor to cause the apparatus to receive, at a communication platform, a first request indicating a first data object that comprises metadata associated with an update to an action of a communication process flow, wherein the metadata indicates a user of the communication platform is to approve the update to the action, post, based at least in part on receiving the first request, an entry into a channel of the communication platform, the entry displaying the metadata associated with the update and configured to receive an indication of approval of the update from the user that is a participant to the channel, receive, at the communication platform and from the user, the indication of the approval of the update to the action of the communication process flow, generate, based at least in part on receiving the indication of the approval, a second data object that includes an indication of the action and an indication of the user, and transmit a second request that includes the second data object, wherein the second request is configured to activate the update to the action of the communication process flow.

Another apparatus for data processing is described. The apparatus may include means for receiving, at a communication platform, a first request indicating a first data object that comprises metadata associated with an update to an action of a communication process flow, wherein the metadata indicates a user of the communication platform is to approve the update to the action, means for posting, based at least in part on receiving the first request, an entry into a channel of the communication platform, the entry displaying the metadata associated with the update and configured to receive an indication of approval of the update from the user that is a participant to the channel, means for receiving, at the communication platform and from the user, the indication of the approval of the update to the action of the communication process flow, means for generating, based at least in part on receiving the indication of the approval, a second data object that includes an indication of the action and an indication of the user, and means for transmitting a second request that includes the second data object, wherein the second request is configured to activate the update to the action of the communication process flow.

A non-transitory computer-readable medium storing code for data processing is described. The code may include instructions executable by a processor to receive, at a communication platform, a first request indicating a first data object that comprises metadata associated with an update to an action of a communication process flow, wherein the metadata indicates a user of the communication platform is to approve the update to the action, post, based at least in part on receiving the first request, an entry into a channel of the communication platform, the entry displaying the metadata associated with the update and configured to receive an indication of approval of the update from the user that is a participant to the channel, receive, at the communication platform and from the user, the indication of the approval of the update to the action of the communication process flow, generate, based at least in part on receiving the indication of the approval, a second data object that includes an indication of the action and an indication of the user, and transmit a second request that includes the second data object, wherein the second request is configured to activate the update to the action of the communication process flow.

In some examples of the method, apparatuses, and non-transitory computer-readable medium described herein, transmitting the second request may include operations, features, means, or instructions for transmitting the second request that may be configured to activate the communication process flow based at least in part on receiving the indication of the approval.

Some examples of the method, apparatuses, and non-transitory computer-readable medium described herein may further include operations, features, means, or instructions for receiving, from a communication process flow management service, an indication of a set of permissions for approving the update to the action, wherein the user may be configured to approve the update based at least in part on the set of permissions.

In some examples of the method, apparatuses, and non-transitory computer-readable medium described herein, the set of permissions may be based at least in part on an action type of the action.

Some examples of the method, apparatuses, and non-transitory computer-readable medium described herein may further include operations, features, means, or instructions for posting, based at least in part on receiving the indication of the approval, an entry into the channel of the communication platform displaying a message indicating that the user lacks permission to approve the update.

In some examples of the method, apparatuses, and non-transitory computer-readable medium described herein, posting the entry into the channel of the communication platform may include operations, features, means, or instructions for posting the entry comprising a user interface component configured to receive the indication of the approval of the update.

In some examples of the method, apparatuses, and non-transitory computer-readable medium described herein, the entry comprises the user interface component based at least in part on a set of permissions for approving the update to the action.

Some examples of the method, apparatuses, and non-transitory computer-readable medium described herein may further include operations, features, means, or instructions for posting, based at least in part on receiving the first request, the entry into a home channel of the communication platform, the entry displaying the metadata associated with the update and configured to receive the indication of approval of the update from the user and receiving, at the home channel of the communication platform and from the user, the indication of the approval of the update to the action of the communication process flow.

In some examples of the method, apparatuses, and non-transitory computer-readable medium described herein, the entry may be configured to receive an indication of approval of the update, an indication to view the update in a communication process flow management service, an indication of suggested changes to the update, an indication of a rejection of the update, an indication to test the update, or any combination thereof, from the user.

Some examples of the method, apparatuses, and non-transitory computer-readable medium described herein may further include operations, features, means, or instructions for receiving, at the communication platform and from the user, an indication to test the update to the action of the communication process flow and transmitting, based at least in part on receiving the indication to test the update, a third data object that comprises a plurality of emails, a date on which to perform the test, personalization strings, or any combination thereof.

Some examples of the method, apparatuses, and non-transitory computer-readable medium described herein may further include operations, features, means, or instructions for receiving, based at least in part on transmitting the third data object, a fourth data object that includes an indication of results of the test and posting, based at least in part on receiving the fourth data object, a second entry that includes the indication of the results of the test.

In some examples of the method, apparatuses, and non-transitory computer-readable medium described herein, transmitting the second request may include operations, features, means, or instructions for transmitting, to a communication process flow management service supporting the communication process flow, the second request that includes the second data object, wherein the second request may be configured to activate the update to the action of the communication process flow.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, at a communication platform from a communication process flow management service that manages a communication process flow for electronic communications between a tenant of the communication process flow management service and a plurality of users associated with the tenant, a first request indicating that a user of the communication platform is to approve an update associated with an action of the communication process flow, wherein the communication platform is separate from the communication process flow management service;
   posting, based at least in part on the first request, an entry into a channel of the communication platform, the entry displaying metadata associated with the update and configured to receive an indication of approval of the update from the user that is a participant to the channel;
   receiving, at the communication platform and from the user, the indication of the approval;
   generating, at the communication platform and based at least in part on the indication of the approval, a data object that includes an indication of the action, an activity status, and the user; and
   transmitting, to the communication process flow management service, a second request that includes the data object and is configured to trigger one or more operations associated with the action of the communication process flow.

2. The method of claim 1, wherein posting the entry displaying the metadata further comprises:
   posting, based at least in part on a trigger condition, an approval request record into the channel of the communication platform, wherein the trigger condition comprises a creation of the action, the update to the action, or a deletion of the action.

3. The method of claim 2, wherein the approval request record indicates the trigger condition, a name associated with the entry, a scope of the action, or any combination thereof.

4. The method of claim 1, wherein the first request indicates an approval type, a title of the approval, the user of the communication platform that is to approve the update, the metadata associated with the update, or any combination thereof, wherein the entry is configured to receive the indication of the approval of the update based at least in part on the first request.

5. The method of claim 1, wherein the entry is configured to receive the indication of approval of the update, an indication of rejection of the update, an indication to reply to the entry via the channel of the communication platform, or a combination thereof, from the user.

6. The method of claim 1, wherein generating the data object further comprises:
   generating a row in a table associated with the communication process flow, wherein the row indicates the action, the activity status, and the user.

7. The method of claim 6, further comprising:
transmitting the second request that is configured to activate the communication process flow based at least in part on the generated row.

8. The method of claim 1, wherein posting the entry into the channel of the communication platform comprises:
posting the entry comprising a user interface component configured to receive the indication of the approval of the update.

9. The method of claim 1, further comprising:
receiving, from the communication process flow management service, an indication of a set of permissions for approving the update to the action, wherein the user is configured to approve the update based at least in part on the set of permissions.

10. The method of claim 1, wherein the communication platform supports a chat service in the channel between multiple users, and wherein the approval is received via the chat service in the channel.

11. An apparatus for data processing, comprising:
one or more memories storing processor-executable code; and
one or more processors coupled with the one or more memories and individually or collectively operable to execute the code to cause the apparatus to:
receive, at a communication platform from a communication process flow management service that manages a communication process flow for electronic communications between a tenant of the communication process flow management service and a plurality of users associated with the tenant, a first request indicating that a user of the communication platform is to approve an update associated with an action of the communication process flow, wherein the communication platform is separate from the communication process flow management service;
post, based at least in part on the first request, an entry into a channel of the communication platform, the entry displaying metadata associated with the update and configured to receive an indication of approval of the update from the user that is a participant to the channel;
receive, at the communication platform and from the user, the indication of the approval;
generate, at the communication platform and based at least in part on the indication of the approval, a data object that includes an indication of the action, an activity status, and the user; and
transmit, to the communication process flow management service, a second request that includes the data object and is configured to trigger one or more operations associated with the action of the communication process flow.

12. The apparatus of claim 11, wherein, to post the entry displaying the metadata, the one or more processors are individually or collectively further operable to execute the code to cause the apparatus to:
post, based at least in part on a trigger condition, an approval request record into the channel of the communication platform, wherein the trigger condition comprises a creation of the action, the update to the action, or a deletion of the action.

13. The apparatus of claim 12, wherein the approval request record indicates the trigger condition, a name associated with the entry, a scope of the action, or any combination thereof.

14. The apparatus of claim 11, wherein the first request indicates an approval type, a title of the approval, the user of the communication platform that is to approve the update, the metadata associated with the update, or any combination thereof, wherein the entry is configured to receive the indication of the approval of the update based at least in part on the first request.

15. The apparatus of claim 11, wherein the communication platform supports a chat service in the channel between multiple users, and wherein the approval is received via the chat service in the channel.

16. A non-transitory computer-readable medium storing code for data processing, the code comprising instructions executable by one or more processors to:
receive, at a communication platform from a communication process flow management service that manages a communication process flow for electronic communications between a tenant of the communication process flow management service and a plurality of users associated with the tenant, a first request indicating that a user of the communication platform is to approve an update associated with an action of the communication process flow, wherein the communication platform is separate from the communication process flow management service;
post, based at least in part on the first request, an entry into a channel of the communication platform, the entry displaying metadata associated with the update and configured to receive an indication of approval of the update from the user that is a participant to the channel;
receive, at the communication platform and from the user, the indication of the approval;
generate, at the communication platform and based at least in part on the indication of the approval, a data object that includes an indication of the action, an activity status, and the user; and
transmit, to the communication process flow management service, a second request that includes the data object and is configured to trigger one or more operations associated with the action of the communication process flow.

17. The non-transitory computer-readable medium of claim 16, wherein the instructions to post the entry displaying the metadata are further executable by the one or more processors to:
post, based at least in part on a trigger condition, an approval request record into the channel of the communication platform, wherein the trigger condition comprises a creation of the action, the update to the action, or a deletion of the action.

18. The non-transitory computer-readable medium of claim 17, wherein the approval request record indicates the trigger condition, a name associated with the entry, a scope of the action, or any combination thereof.

19. The non-transitory computer-readable medium of claim 16, wherein the first request indicates an approval type, a title of the approval, the user of the communication platform that is to approve the update, the metadata associated with the update, or any combination thereof, wherein the entry is configured to receive the indication of the approval of the update based at least in part on the first request.

20. The non-transitory computer-readable medium of claim 16, wherein the communication platform supports a chat service in the channel between multiple users, and wherein the approval is received via the chat service in the channel.

\* \* \* \* \*